United States Patent [19]

Pyle

[11] 3,852,048

[45] Dec. 3, 1974

[54] PROCESS FOR PRODUCING INDUSTRIAL FUEL FROM WASTE WOODY MATERIALS

[75] Inventor: Owen Pyle, Anchorage, Ky.

[73] Assignee: The Kingsford Company, Louisville, Ky.

[22] Filed: July 14, 1972

[21] Appl. No.: 271,795

[52] U.S. Cl. .................... 48/209, 44/1 E, 48/111, 201/2.5, 201/30
[51] Int. Cl. ............................................ C10j 3/00
[58] Field of Search ....... 48/209, 111, 197 FM, 210, 48/197 R; 201/7, 8, 27, 28, 29, 44, 16, 2.5, 34, 30, 15; 44/1 D, 1 E, 1 F, 1 R, 10 B, 10 C, 10 H, 10 K

[56] References Cited
UNITED STATES PATENTS

| | | | |
|---|---|---|---|
| 3,379,622 | 4/1968 | Dreusche | 201/8 |
| 3,414,480 | 12/1968 | Stotler et al. | 201/15 |
| 3,436,314 | 4/1969 | Leonor | 202/17 |
| 3,671,402 | 6/1972 | Wenzel et al. | 201/15 |

OTHER PUBLICATIONS
Gallagher, "Utilization of Off Gases From Herreschoff-Furnace Charcoal Production."

Primary Examiner—S. Leon Bashore
Assistant Examiner—Peter Kratz
Attorney, Agent, or Firm—LeBlanc & Shur

[57] ABSTRACT

A continuous process is described whereby waste woody materials such as bark, twigs, sawdust, plantation waste, and peanut shells, containing around fifty percent moisture are initially predried, and subsequently carbonized, to produce a high yield of relatively pollution-free industrial fuels. By utilizing a two-step process an optimum flow rate of gas may be achieved during both the drying and carbonization steps to maximize the formation of solid and gaseous fuels and to minimize the formation of condensable liquids during pyrolysis. The products of the process of this invention may be a solid industrial fuel, charcoal having more than approximately 23 percent volatile combustible matter, and a fuel gas having fuel value of from approximately 150–185 B.t.u. per standard cubic foot or more. The solid fuel is enriched by allowing the condensible combustible matter in the fuel gas to adsorb thereon. In the alternative, charcoal formed may be pulverized and suspended in a major portion of the gas to produce an enriched fuel gas having a fuel value of from about 400 to 625 B.t.u. per standard cubic foot. The fuel gas may be produced in quantities sufficient to allow use of the sensible heat from a portion thereof for the initial drying step, if desired.

23 Claims, 5 Drawing Figures

FUEL
TYPICAL VALUE RANGE
OF CHARCOAL ENRICHED GAS

TYPICAL CARBONIZATION IN
MULTIPLE HEARTH FURNACE 3,852,048

PROCESS FOR PRODUCING INDUSTRIAL FUEL FROM WASTE WOODY MATERIALS

This invention relates to the production of fuels and specifically to an economical process for the preparation of solid and gaseous, low sulfur industrial fuels from waste materials. In addition, this invention relates to a relatively pollution-free method for disposing of woody vegetable wastes by converting them to industrial fuel thereby providing a fuel which will combust without creating sulfur dioxide or noxious or visible smoke. The term "woody" is employed herein broadly to include nut shells such as walnut shells, fruit pit shells such as almond shells, and peach pit shells, pods such as peanut shells and the like. The term is also intended to include processed cellulosic materials such as molded pulp containers, corrugated paper board, paper, soft board, hard board, extracted stumps and other carbonizable wastes of vegetable origin.

Incineration has been a usual industrial method for disposing of waste materials such as bark, sawdust, twigs, plantation wastes, and nut shells. Incineration, however, presents certain problems because it is expensive and inefficient and, unless it is carried out with elaborate safeguards, the air emissions produced are environmentally unacceptable. Presently, the only important short term alternatives to incineration are to allow these materials to accumulate pending development of a more efficient relatively pollution-free use therefor or to burn them as relatively inefficient fuel.

It has been suggested in the past that these waste materials may be pyrolized. Various processes for using these materials to form charcoal or fuel gas, or low volatile, unreactive charcoal, or even activated carbon, are known. However, an economical, industrially acceptable process that conserves even seventy percent of their potentially recoverable heat values has not been developed.

Approximately 75 or more percent of the charcoal currently produced in the United States is used to make luxury products, specifically barbeque briquettes, large scale use of charcoal for other purposes being now more or less obselete. However, according to the present invention, there has now been discovered a new process involving the production of industrial fuels through a unique usage of charcoal of a primarily different type than that utilized in briquettes.

As is well known to those skilled in the art, the thermal efficiency of prior carbonization processes for these materials has been quite low. This low efficiency stems in part from the fact that the aforementioned materials usually contain a high water content of about 50 percent. The products produced by these processes were generally expensive or had relatively low fuel values. From a purely economic standpoint, pyrolysis of these waste materials according to prior procedures has not been a widely accepted means for disposal.

Furthermore, in order to avoid an industrial fuel crisis caused by depletion of oil, natural gas, and coal reserves, many attempts have been made to discover and develop new fuel sources. In view of environmental considerations, such a fuel should necessarily be virtually pollution-free. However, even though an ample supply of woody waste materials is present at many industrial sites, no satisfactory means for utilizing them efficiently as a fuel had, prior to this invention, been developed.

For example, in many paper making plants, green bark and other woody waste materials have been allowed to accumulate. In others they are burned as relatively high cost and inefficient fuel to implement disposal. At the same site energy requirements for steam generators have often been at least partially satisfied through the use of conventional, sulfur-containing fuels or expensive low sulfur fuels. The waste materials frequently have not been utilized to satisfy these energy requirements because an economical process for converting them to efficient, low air pollution fuels had, prior to this invention, not been developed.

U.S. Pat. No. 3,379,622 to von Dreusche Jr. describes the use of a conventional multiple hearth furnace to carbonize woody waste materials, forming charcoal. While this charcoal is capable of use as fuel, the process described therein does not provide sufficient yield to economically justify industrial utilization, except for luxury fuel products such as barbecue briquettes.

It has been discovered, however, that woody waste materials can be economically utilized as an industrial fuel source according to the process of this invention. One essential feature of the present invention lies in the discovery that these materials may be efficiently converted to industrial fuels if the process therefor includes separate steps of drying and carbonization. Prior processes for conversion of woody waste materials to either gaseous or solid fuels involved either a single phase carbonization in a furnace or kiln, or a multiple-phase process wherein minute particles were entrained in a concurrent stream of gas as is described in U.S. Pat. No. 3,436,314 to Leonor. The Leonor process, however, is also inefficient and expensive to operate. More importantly, however, this process will not meet air pollution standards.

The process of this invention for converting woody waste materials such as bark, sawdust, twigs, bagasse, shells and the like to industrial fuels involves drying, an endothermic reaction, and carbonization, an exothermic reaction, to yield charcoal, an excellent solid industrial fuel preferably containing more than twenty three percent volatile combustible matter (VCM) plus a "low" B.t.u. fuel gas. The fuel value of this gas is similar to that of producer gas. In the alternative, pulverized charcoal may be suspended in the gas for use directly at the site as an enriched fuel gas. Charcoal in this instance may contain a lesser quantity of VCM, if desired.

If the above two steps are carried out in a single reaction vessel, such as a multiple hearth furnace, however, it is impossible to optimize reaction conditions. The relatively high rate of hot gas flow essential to adequate heat exchange for drying is unnecessary and undesirable for carbonization.

To dry the materials efficiently it is necessary to maximize a gas flow therethrough. However, to efficiently carbonize the materials the gas flow rate should be minimized. The gas flow for carbonization need only be sufficient to sweep the volatile gases formed from the solids.

Therefore, woody waste materials are efficiently converted to industrial fuels, according to the process of this invention, in two separate steps. The materials are initially dried until they contain less than 15 percent moisture, and subsequently the dried materials are fed into a furnace or kiln for carbonization. Both steps are thereby carried out under optimum conditions and the gaseous and solid products formed have fuel values sufficiently high for industrial use as fuels. Moreover, by predrying the raw materials, the capacity of the furnace or kiln used for carbonization, particularly in the case of a multiple hearth type furnace, will be increased, and predrying may be achieved using the sensible heat from a portion of the gas formed or by burning a portion thereof, or both.

If an enriched fuel gas for use at the site is desired, the charcoal formed is pulverized and suspended in the fuel gas formed in excess of that required for drying. The enriched fuel gas may have a fuel value ranging from 400 to 625 B.t.u. per standard cubic foot (s.c.f.) depending on process conditions and is, therefore, a highly efficient industrial fuel.

If solid fuel is desired, or if it is desirable to produce industrial fuels for storage or sale either the temperature or residence time in the carbonizer or both may be controlled in a well known manner to produce charcoal having more than approximately twenty three percent VCM. It has been discovered that charcoal having volatiles in this range is an extremely efficient powdered burner fuel, for example, in steam generation.

The charcoal thus formed is cooled to a temperature not exceeding 150°F. The off gas from carbonization is also allowed to cool down to no less than about 220°F. but preferably from 300°F. to 400°F. The gas is then passed through the charcoal in a suitable adsorber to adsorb the condensable combustible matter from the gas, onto the charcoal. The gas is then thoroughly cleaned in for example a highly efficient cyclone system to remove particulate matter entrained therein. The cleaned gas and the charcoal are then suitable for storage, use as burner fuels, or for transport.

It must be emphasized that the off gas byproduct from carbonization is not suitable for storage or transport for any substantial distance. However, it has been discovered that if the gas is processed as outlined herein, a commercially storable and transportable, highly efficient industrial fuel can be produced.

The gas contains pyroligneous acid including such materials as methanol, formic acid, acetic acid, tars, etc. As the gas cools, these materials, which have good fuel values, condense, forming corrosive liquids. However, by adsorbing these materials on the charcoal their fuel value is not lost and corrosion is minimized. In addition, the off gas contains particulate matter which also must be removed or it will settle out during storage.

It must also be emphasized that prior to the instant invention charcoal produced by continuous processes, having more than twenty three percent VCM was thought to be too pyrophoric to be of any industrial use. For example, such charcoal used in briquettes typically contains about 20 percent VCM. If more than 23 percent VCM are present the briquettes have a tendency to ignite during the process of drying after compaction. However, charcoal alone having less than 23 percent VCM is not as efficient a fuel for industrial purposes.

It has now been discovered that charcoal having over 23 percent VCM produced according to the process of this invention is an extremely effective powdered burner fuel capable of up to approximately 90 percent efficiency in steam generation.

The instant invention therefore is a continuous process for producing, efficiently and economically, solid, gaseous, or enriched gaseous industrial fuels from waste materials. The process of this invention may be used to produce fuels which may be used immediately at the site, taking advantage of the sensible heat thereof, or they may be stored or transported. However, it is preferred to utilize the charcoal from carbonization as a powdered burner fuel or to entrain the charcoal in the fuel gas as an enriching agent.

Accordingly, it is an object of this invention to provide an economical means for efficiently converting woody vegetable waste materials to solid and gaseous fuel.

It is another object to provide a continuous process for producing virtually pollution free industrial fuels from woody waste material.

It is another object to provide an economical means for disposing of woody vegetable materials without an unacceptably high amount of air pollution.

It is a further object to provide a continuous process for carbonizing woody waste materials without exhausting appreciable pollutants into the atmosphere.

It is yet another object to provide an economical process for forming solid and gaseous industrial fuels from woody vegetable waste materials by initially partially drying the materials in a stream of hot gas, and subsequently carbonizing the dry materials to form charcoal and fuel gas, drying being achieved by use of the sensible heat from a portion of the gas formed.

It is still another object to provide a relatively pollution-free process for converting woody vegetable wastes having a water content of approximately 50 percent to relatively pollution-free solid and gaseous industrial fuel by initially drying the materials in a drier using the gas formed by carbonization, until the moisture content is less than 15 percent and then transferring said dry materials to a carbonizer for carbonization to form charcoal and a gas having a fuel value typically of about 150 B.t.u. per cubic foot or more, which charcoal may be pulverized and entrained in the gas to form an enriched fuel gas.

It is yet another object to provide a relatively pollution-free, versatile process for converting woody vegetable wastes having a water content of approximately 50 percent to produce, as desired, a relatively pollution-free enriched fuel gas for use on the site as an industrial burner fuel, or to produce charcoal having more than 23 percent VCM and a fuel gas, which charcoal may be pulverized, cooled, conditioned, and used to adsorb the combustible, condensable matter in the gas so that when particulates have been removed from the gas, both the gas and the charcoal are available for storage, use, or transportation as highly efficient industrial burner fuels.

These and other objects and advantages of the present invention will become more readily apparent upon reference to the following specification and drawings wherein.

Figure 1:
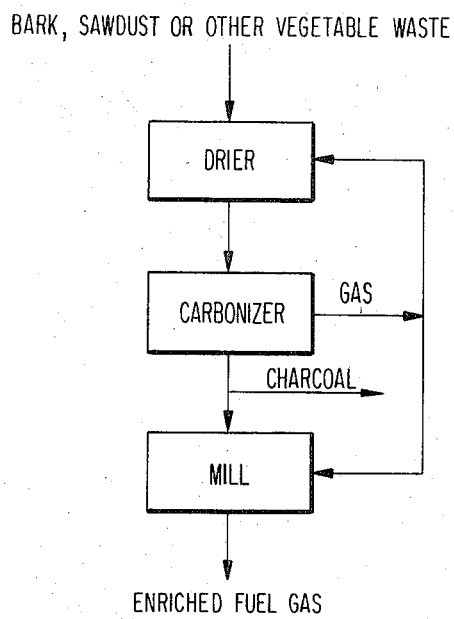
FIG. 1 is a block diagram showing a preferred flow sheet for the process of this invention.

With reference to the drawings and in particular to the flow sheet of FIG. 1, the raw materials for the process of this invention may be, as stated, any woody vegetable materials such as bark, chips, sawdust, twigs, plantation wastes, bagasse and shells. These materials may have a water contents varying up to 60 percent, by weight. For use in the process of this invention the feed materials may be in any convenient form from particles such as sawdust to flat slab-like pieces several inches in diameter. However, if the pieces are very thick they should be comminuted before being admitted to the drier.

The waste materials are initially fed into a drier and the moisture content is lowered therein to less than 15 percent or preferably to from 5 to 10 percent. It is not essential to the process of this invention that the materials be completely dry before carbonization.

Any well known drying implement capable of continuous operation may be used within the scope of this invention. However, a rotary drier using a portion of the hot gas from the subsequent carbonization process is preferred. This gas leaves the carbonizer, typically, at a temperature of from 800–1,200°F. and is used in the drier to heat the waste materials to from 175–180°F. up to as high as 225°F. Preferably, however, the materials are heated to the boiling point of the moisture in the materials in the drier.

The dried wood is then fed into a carbonizer. The carbonizer may be any conventional device such as a shaft or rotary kiln or a rotary hearth furnace, but preferably is a multiple hearth furnace similar to that disclosed in the aforementioned von Dreusche Jr. patent. During carbonization the furnace gas temperature may reach 1,400°F., but, as is well known in the art, if the temperature of the wood therein exceeds about 1,000°F., a low volatile char such as unreactive metallurgical charcoal will result. Typically the temperature of the wood in the furnace ranges from about 600°F. as carbonization begins and rarely exceeds about 900°F.

It must be pointed out that an essential feature of this invention resides in heat transfer characteristics in the drier as contrasted to the carbonizer. In the drier it is desirable to maintain a maximum rate of flow of hot gas through the materials to be dried. The drying process, being endothermic, will proceed at a rate proportional to the rate at which heat is transferred from the hot gases to the woody materials. This rate, in turn, depends among other things upon the flow rate of hot gases through the drier. Therefore the gas flow rate in the drier should be the highest possible consistent with the operating characteristics of the drying implement employed.

In contrast, the carbonization process is exothermic and should be allowed to proceed with only a minimum flow of gases through the furnace. Although it is necessary to sweep the volatile products of pyrolysis from the beds of solids for collection, any increase in flow rate of gases through the furnace will lower the efficiency of the carbonization process and dilute the fuel gases formed.

Accordingly, by drying the raw materials before admitting them to the carbonizer both processes may occur with optimum gas flow rates for drying and carbonization. The yield of gaseous and solid smokeless fuels is thereby maximized.

Following carbonization, the off gas (typically having a temperature of 800°–1200°F.) in excess of that required for drying, is available for use as a fuel after particulates are removed therefrom. The gas, after processing as will be subsequently explained, has been found to have a fuel value similar to that of producer gas or higher.

In the alternative the off gas may be mixed with the charcoal particles in a conventional mill such as a Raymond roller mill, or a ball mill or impact pulverizer. The charcoal particles are pulverized in the mill until at least 60 percent, but preferably about 75 percent pass through a 200 mesh screen (U.S. Standard sieve), and are entrained in the gas to form an enriched fuel gas.

This invention, as will be obvious to those skilled in the art, is not intended to be limited to the consistency of the pulverized charcoal particles. The consistency utilized will depend, in part, upon the distance the enriched gas is to be conveyed and the type of system used therefor.

Normally about 24 to 30 standard cubic feet of gas are required to entrain each pound of charcoal. The yield of gas according to the process of this invention has been found to be adequate for both drying and entrainment of the powdered charcoal at this level. Greater dilution may be practical depending upon conditions.

Figure 4:
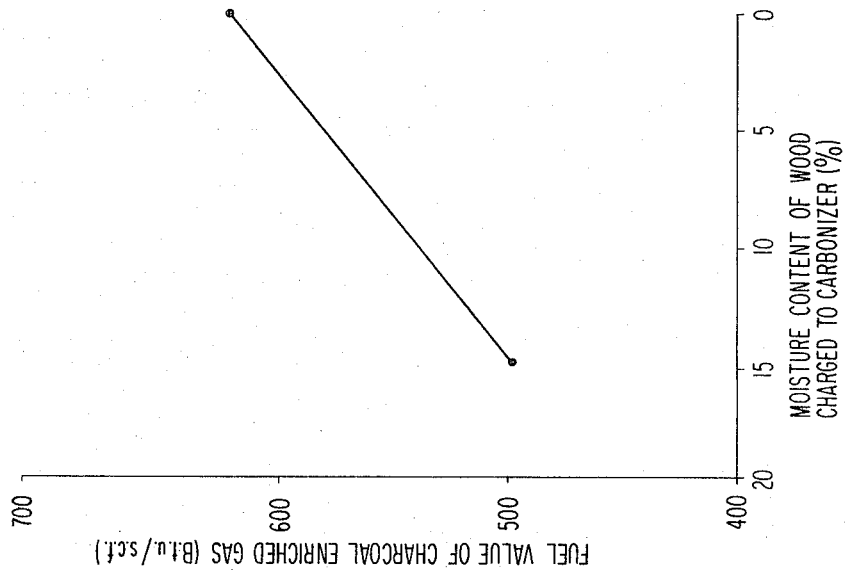
FIG. 4 is a graphical representation of a typical fuel value range of an enriched fuel gas plotting the fuel value of the enriched gas in B.t.u. per standard cubic feet of gas as compared to the moisture content of the wood charged to the carbonizer.

As shown in FIG. 4 the enriched fuel gas produced according to the process of this invention may have a fuel value of up to around 600 B.t.u. per standard cubic foot, but the fuel value decreases as the moisture content of the wood admitted to the carbonizer increases. This gas, however, should be used as a fuel immediately at the site because, as will be obvious to those skilled in the art, the particulate matter will settle out if the gas is conveyed any substantial distance.

If desired, the charcoal particles alone may be conveyed by any well known means directly to a stoker. The charcoal could then be used as a solid fuel with or without pulverizing depending on the particle size.

The entire gas output, as will be subsequently explained, could be used in the drier, if desired, without burning. After the sensible heat in the gas has been used for drying, this gas could be piped to another site for use as a fuel, or stored.

EXAMPLE I

Figure 2:
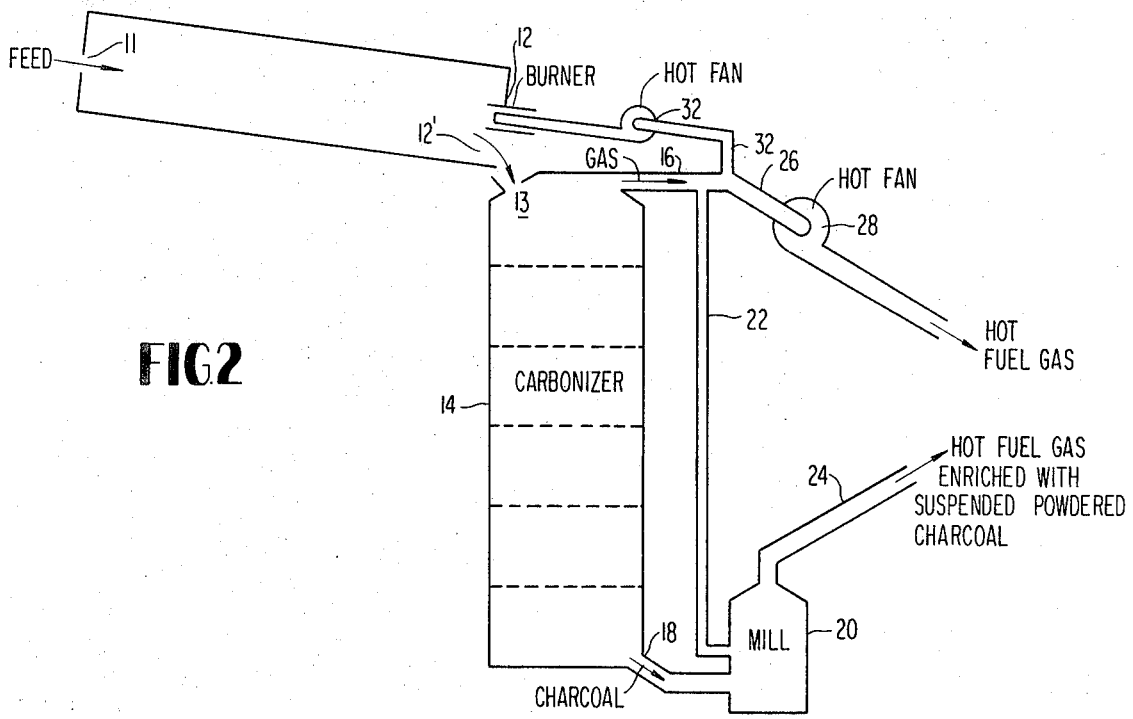
FIG. 2 is a schematic diagram showing certain of the important features of equipment which may be used in an embodiment of this invention.

FIG. 2 shows an example of implements useful in a preferred embodiment of the process of this invention. In order to evaluate the efficiency of the process of this invention the following is a general example thereof with an energy balance. With attention to FIG. 2, for the purpose of illustration, 2 tons of green bark waste having a water content of 50 percent are fed into a conventional rotary drier 10 through inlet 11. Some off gas from carbonization is burned in burner 12 and provides about 2,000,000 B.t.u. sensible heat for the drying process. The materials are heated therein to a temperature of about the boiling point of the moisture therein. Subsequently, dried woody materials having a 5 percent water content exit drier 10 through outlet 12' and enter inlet 13 of multiple hearth furnace 14 for carbonization.

One ton of dry bark has been found to have a heat value of approximately 8,000 B.t.u. per pound or 16,000,000 B.t.u. total in this instance. This figure reflects about five percent ash from sand and other foreign matter picked up in mechanically handling the materials, including ash normally derived from clean bark. However, because it takes about 2,000,000 B.t.u. to initially dry the wood, and because this energy is provided by the off gas from carbonization, the net input to the carbonizer 14 has a fuel value of about 14,000,000 B.t.u.

The dried bark is then carbonized in furnace 14 by heating to a temperature of from 600°F. to about 900°F. to yield off gas at outlet 16 and charcoal at outlet 18. The charcoal resulting has a weight of about 600 pounds with 20 percent VCM and a fuel value of 13,500 B.t.u. per pound or a total fuel value of 8,100,000 B.t.u.

It has been found that typically the heat losses from the furnace are about 2,999,000 B.t.u., and the gas exiting the sytem has a total fuel value of about 3,400,000 B.t.u., or about 183 B.t.u. per standard cubic foot. Therefore, about 18,600 standard cubic feet of fuel gas at about 1,000°F. are formed and are available for use or sale following the carbonization of about two tons of green bark waste according to the process of this invention.

The following is a summary in table form of the heat balance for the preceeding example.

HEAT BALANCE
CARBONICATION FOR FUEL VALUES
1-ton 5% ash DRY BARK, SAWDUST or SIMILAR Assume dry heat value = 8,000 Btu./lb. = 16,000,000 Btu./ton

| | B.t.u. × 10⁶ |
|---|---|
| Dry 2 tons 50% moisture wood | 2.0 |
| Carbonization heat losses | 2.0 |
| 600 lb. charcoal at 13,500 Btu./lb. | 8.1 |
| 18,600 s.c.f. fuel gas at 183 Btu./cu.ft. | 3.4 |
| | 15.5 |
| 1000°F. sensible heat in fuel gas | 0.5 |
| | 16.0 |

If been found is desired to use the carbonization products as an enriched fuel 2,000,000 the charcoal passes through conduit 18 to system conventional roller mill 20 where it is pulverized to a consistency whereby 75 percent passes through a 200 mesh screen, and is entrained in the off gas admitted through conduit 22 from outlet 16. The enriched fuel gas from mill 20 may then be conveyed through conduit 24 for use as fuel to a burner (not shown) as a virtually non-polluting energy source.

A portion of the gas from outlet 16 may also be routed through conduit 26 to a conventional hot fan 28 for transfer to, for example, a burner (not shown) for use also as a virtually non-polluting energy source. If this gas is to be stored or transported it should be processed according to this invention, as will be subsequently explained. A smaller portion of the gas may be used directly in the drier 10 by routing it to a hot fan 30, through conduit 32, and thence to the burner 12 in the drier 10.

In the alternative, if the charcoal formed is intended for use as a solid fuel, it may be transferred by a conveyor (not shown) to, for example, a boiler. Preferably, however, the procedure of the following example will be used if the charcoal is intended for use as a solid fuel.

Figure 3:
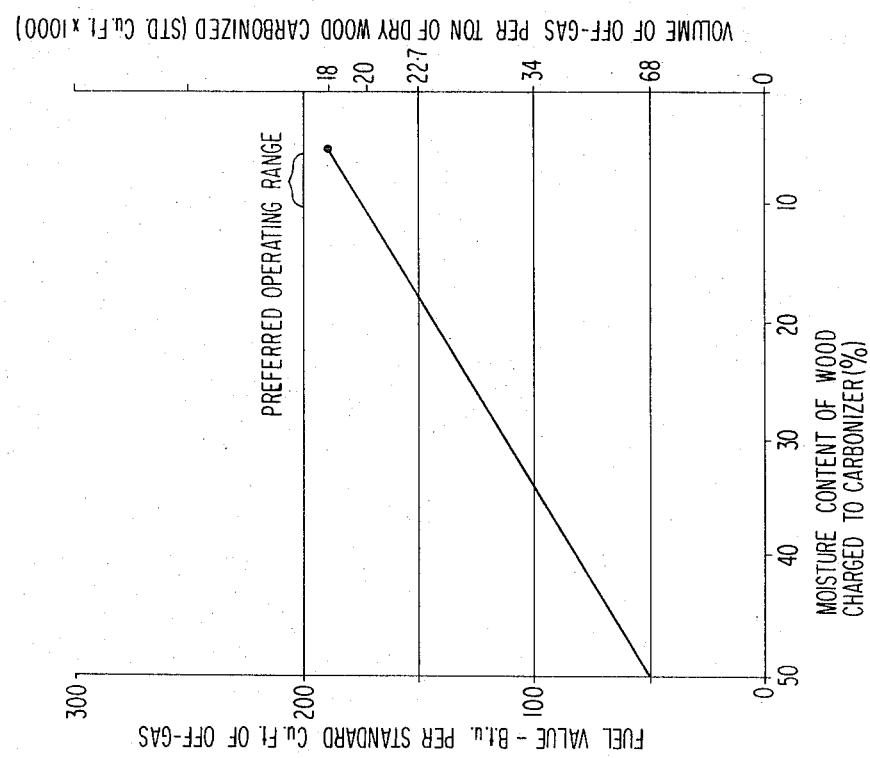
FIG. 3 is a graphical representation of a typical carbonization in a multiple hearth furnace plotting the fuel value in B.t.u. per standard cubic foot of off gas formed and the volume in standard cubic feet of gas per ton of dry wood carbonized as compared to the moisture content of the wood charged to the carbonizer.

FIG. 3 summarizes graphically, carbonization in a multiple hearth furnace. As shown therein both the fuel value per cubic foot and volume of off gas produced increase as the moisture content of the wood charged to the furnace decreases. Therefore, the optimum operating conditions for carbonization, as indicated in FIG. 3, are found when the wood charge has a moisture content of less than about 15 percent.

EXAMPLE II

Figure 5:
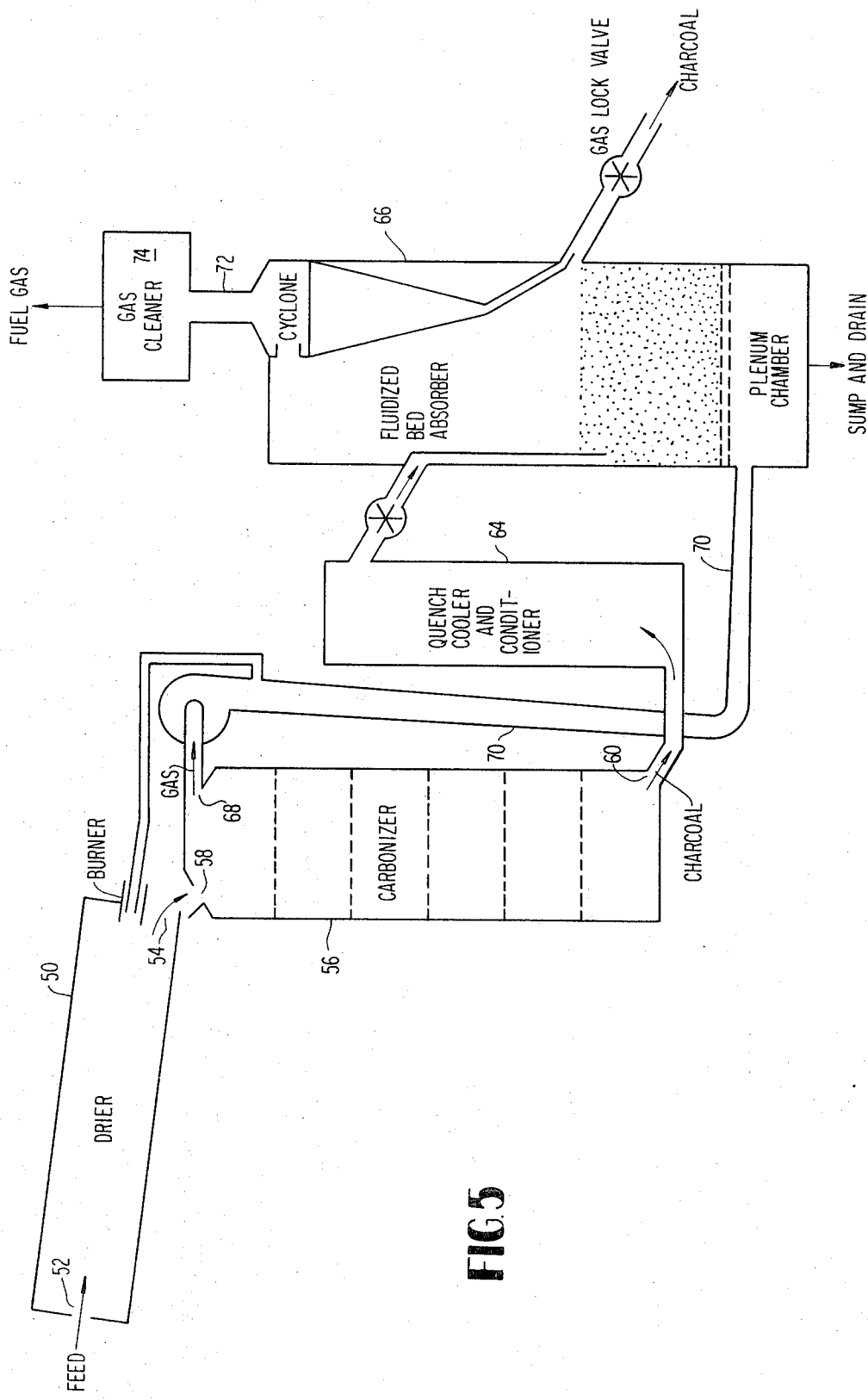
FIg. 5 is a schematic diagram showing certain important features of equipment which may be used in another embodiment of this invention.

In a preferred embodiment the process of this invention may be used to convert woody vegetable waste materials to solid and gaseous, essentially pollution-free industrial fuels as follows:

With attention to FIG. 5, the woody waste materials are, as in Example I, continuously admitted to a rotary drier 50 at inlet 52 wherein they are heated to a temperature of about 200°F. and dried to a moisture content of preferably about 5 percent. Dried materials continuously exit drier 50 at outlet 54 and enter multiple hearth furnace 56 at furnace inlet 58 for carbonization.

Carbonization proceeds in furnace 56 in the well known manner, but in this embodiment, charcoal exits furnace 56 at outlet 60 having a high volatile content. It is desired in this embodiment to produce charcoal having a VCM content of more than about twenty three percent. To achieve the desired VCM content, either the residence time in the furnace or the carbonization temperature, or both, are controlled in a well known manner within the skill of an ordinary practitioner in the art.

As stated, it has been discovered that when the VCM content is as high as indicated above, the charcoal produced will be sufficiently flammable to be used in powdered form as an extremely efficient and economical industrial fuel. The majority of charcoal produced in multiple hearth furnaces has a VCM content of less than 23 percent. Because this charcoal will not burn nearly as efficiently in a standard powdered coal burner, charcoal has not in the past been widely utilized as a solid, industrial fuel. However, charcoal produced according to the process of this invention can be used in conventional burners as a highly efficient industrial fuel. The charcoal exits carbonizer 56 at outlet 60 whereupon it is conveyed to cooler 64.

The charcoal is then quench cooled to a temperature not exceeding about 150°F., and stabilized with water and mixing to prevent spontaneous combustion in apparatus 64. The stabilized charcoal is then conveyed to an adsorber 66.

The adsorber 66 functions in the process of this invention to remove combustible, condensable matter from the off gas and adsorb this matter on the charcoal. The condensable matter in the off gas includes corrosive acids. The presence of these acids in the off gas creates storage and transportation problems if the gas is not handled in expensive corrosion resistant equipment. The acids, however, have good fuel values, and it therefore is essential to an efficient process for using the potential fuel value of the waste vegetable materials that these acids are retained in the fuel produced.

In order to minimize corrosion and to maximize the fuel value of the products of this invention, the off gas from outlet 68 in furnace 56 is collected in conduit 70. The gas is allowed to cool to a temperature in excess of about 220°F., or preferably about 300°F. to 400°F., and then routed to adsorber 66. Adsorber 66 may be any well known implement such as a fluidized bed.

The gas then passes through the charcoal in adsorber 66, and as the gas cools the condensable matter is adsorbed on the charcoal. The gas is then conveyed by conduit 72 to a suitable implement 74 for removing particulate matter suspended therein. Implement 74 may be, if desired, a highly efficient cyclone system, such as an Aerodyne Series S Dust Collector, or Pircon Pentapure Impinger.

It should be noted that it is preferred to remove particulate matter from the gas to the maximum extent possible with the aforesaid equipment. The gas may then be stored without significant problems caused by settling. More importantly, however, the clean gas may be used more efficiently in a wide variety of burners without fouling, and therefore could be marketed commercially as a "low" B.t.u. fuel gas.

It is also desired to maintain the charcoal product from adsorber 66 under conditions wherein it will retain less than one percent moisture. The charcoal produced by the process of this invention may then be routed from adsorber 66 directly to, for example, a boiler (not shown), or it may be stored or transported. The charcoal has been found to be an excellent powdered fuel and an inexpensive substitute for conventional solid or powdered fuels. Steam may be generated with this charcoal as fuel in a boiler with efficiencies of up to ninety percent.

A process for converting moist, woody waste material to virtually pollution-free solid and gaseous fuels has been presented. This invention provides an economical and efficient means for disposing of these waste materials. The materials are initially dried and carbonized in a kiln or furnace to yield charcoal and fuel gas. The charcoal is then pulverized, cooled, conditioned, and used to adsorb the combustible condensable matter in the gas. The gas is then cleaned to remove particulate matter therefrom. The charcoal and gas are then available for use, storage, or transport. A portion of the gas formed by carbonization may be used to dry the waste materials. The gas and charcoal may be used individually as highly efficient industrial fuels or admixed to form an enriched fuel gas.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A process for making substantially pollution free solid and gaseous fuels from woody materials comprising the steps of:
   continuously supplying said materials to a drier;
   drying said materials until the moisture content thereof is less than about 15 percent;
   admitting said dried materials to a carbonizer;
   pyrolyzing said materials in said carbonizer to form charcoal having at least about 23 percent volatile combustible matter therein and fuel gas having a fuel value of at least about 150 B.t.u. per standard cubic foot;
   collecting said charcoal, and cooling said charcoal to a temperature of not more than about 150°F;
   collecting at least a major portion of said fuel gas and allowing said collected gas to cool to a temperature of not less than about 220°F;
   admitting said gas and said charcoal to an adsorber;
   cooling said gas in said adsorber and allowing the condensable combustible matter therein to adsorb on said charcoal to form an enriched solid fuel.

2. The process of claim 1 further comprising:
   collecting said gas after the condensable matter therein has been adsorbed on said charcoal;
   removing substantially all of the particulate matter from said gas to form a gaseous fuel.

3. The process of claim 1 further comprising the step of:
   collecting said charcoal after the condensable matter in said gas has been adsorbed thereon;
   pulverizing said collected charcoal until at least about 60 percent passes through a 200 mesh screen.

4. The process of claim 3 wherein the step of pulverizing said charcoal comprises pulverizing said charcoal until about 75 percent passes through a 200 mesh screen.

5. The process of claim 2 wherein the step of removing the particulate matter from said gas comprises removing at least 99 percent, by weight, of the particulate matter suspended therein.

6. The process of claim 1 further comprising:
   returning at least a portion of said fuel gas to said drier;
   utilizing the sensible heat of said portion of said gas in said drier to dry said material.

7. The process of claim 6 wherein said drying step comprises:
   heating said materials in a rotary drier, having a feed inlet at one end and an outlet at an opposite end, to from about 175°–225°F. until the moisture content thereof is less than approximately 15 percent, by circulating a stream of hot gas therethrough.

8. The process of claim 7 wherein said materials are heated to about 200°F. in said drier.

9. The process of claim 6 wherein a burner is disposed at one end of said drier and said drying step further comprises:
   burning the portion of said fuel gas returned to said drier in said burner, and circulating the products of combustion thereof through said drier.

10. The process of claim 1 wherein said carbonizer is a multiple hearth furnace and said pyrolysis step comprises heating said dry materials in said furnace to a temperature of from about 600°F. to less than about 1,000°F. to form charcoal having at least about twenty three percent volatile combustible matter and hot fuel gas having a fuel value of about 150–185 B.t.u. per standard cubic foot and having a temperature of from about 800°–1,000°F.

11. The process of claim 10 wherein said pyrolysis step comprises heating said materials to from about 600°F. to about 900°F.

12. The process of claim 1 wherein said woody materials have a moisture content of less than about 60 percent.

13. The process of claim 12 wherein the water content of said materials is about 50 percent.

14. A continuous process for making substantially pollution-free solid and gaseous fuels from woody materials comprising the steps of:

supplying said materials to a drier;

drying said materials until the moisture content thereof is less than about 15 percent;

admitting said dried materials to a multiple hearth furnace carbonizer;

pyrolyzing said materials in said carbonizer to form charcoal having at least about 23 percent volatile combustible matter therein and a fuel gas having a fuel value of at least about 150 B.t.u. per standard cubic foot;

collecting said charcoal for use as a solid industrial fuel;

collecting said gas for use as a gaseous industrial fuel;

cooling said charcoal to a temperature of not more than about 150°F.;

collecting at least a major portion of said fuel gas and allowing said collected gas to cool to a temperature of not less than about 220°F.;

admitting said gas and said charcoal to an adsorber;

cooling said gas in said adsorber and allowing the condensible combustible matter therein to adsorb on said charcoal to form an enriched solid fuel.

15. The process of claim 14 further comprising the step of:

pulverizing said collected charcoal until at least about 60 percent passes through a 200 mesh screen.

16. The process of claim 15 wherein the step of pulverizing said charcoal comprises pulverizing said charcoal until about 75 percent passes through a 200 mesh screen.

17. The process of claim 14 further comprising:

returning at least a portion of said fuel gas to said drier;

utilizing the sensible heat of said portion of said gas in said drier to dry said material.

18. The process of claim 17 wherein said drying step comprises:

heating said materials in a rotary drier, having a feed inlet at one end and an outlet at an opposite end, to from about 175°–225°F. until the moisture content thereof is less than approximately 15 percent, by circulating a stream of hot gas therethrough.

19. The process of claim 18 wherein said materials are heated to about 200°F. in said drier.

20. The process of claim 17 wherein a burner is disposed at one end of said drier and said drying step further comprises:

burning the portion of said fuel gas returned to said drier in said burner, and circulating the products of combustion thereof through said drier.

21. The process of claim 14 wherein said pyrolysis step comprises heating said materials to from about 600°F. to about 900°F.

22. The process of claim 14 wherein said woody materials have moisture content of less than about 60 percent.

23. The process of claim 22 wherein the water content of said materials is about 50 percent.

* * * * *

UNITED STATES PATENT OFFICE
CERTIFICATE OF CORRECTION

Patent No. 3,852,048     Dated December 3, 1974

Inventor(s) Owen Pyle

It is certified that error appears in the above-identified patent and that said Letters Patent are hereby corrected as shown below:

Col. 1, line 43, "obselete" should read --obsolete--.
Col. 6, line 55 "could be" should read --could then be--.
Col 7 line 26, "beenfound" should read --been found--; line 27, "2,999,000" should read --2,000,000--; line 40, "CARBONICATION" should read --CARBONIZATION--; line 52, "If been found is" should read --If it is--; line 53, "2,000,000" should read --gas,--; line 54, "system" should read --a--.
Col.9, line 20, "or Pircon" should read --or a Pircon--.

Signed and sealed this 1st day of April 1975.

(SEAL)
Attest:

RUTH C. MASON
Attesting Officer

C. MARSHALL DANN
Commissioner of Patents
and Trademarks